(12) United States Patent
Khan et al.

(10) Patent No.: US 7,684,314 B2
(45) Date of Patent: Mar. 23, 2010

(54) COMMUNICATION NODE AND ROUTING METHOD

(75) Inventors: Ashiq Khan, Yokosuka (JP); Toshihiro Suzuki, Yokohama (JP); Motonari Kobayashi, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 398 days.

(21) Appl. No.: 11/676,872

(22) Filed: Feb. 20, 2007

(65) Prior Publication Data

US 2007/0195713 A1    Aug. 23, 2007

(30) Foreign Application Priority Data

Feb. 21, 2006    (JP) .................... P2006-044328

(51) Int. Cl.
*H04L 12/26* (2006.01)
*H04L 12/28* (2006.01)

(52) U.S. Cl. ................. 370/216; 370/252; 370/255

(58) Field of Classification Search ................ None
See application file for complete search history.

(56) References Cited

U.S. PATENT DOCUMENTS

| | | | |
|---|---|---|---|
| 7,009,987 B1* | 3/2006 | Matsuzawa et al. | 370/409 |
| 2002/0145978 A1* | 10/2002 | Batsell et al. | 370/238 |
| 2003/0012166 A1* | 1/2003 | Benveniste | 370/338 |
| 2003/0202524 A1 | 10/2003 | Conner et al. | |
| 2007/0174483 A1* | 7/2007 | Raj et al. | 709/238 |
| 2007/0201427 A1* | 8/2007 | Lee et al. | 370/351 |

FOREIGN PATENT DOCUMENTS

EP    1 473 890 A2    11/2004

OTHER PUBLICATIONS

U.S. Appl. No. 60/772,562, Ji-Hoon Lee et al., Cross-Layer Optimized Multipath Structure for Throughput Enhancement in Wireless Mesh Networks, filed Feb. 13, 2006.*
Ming-Hong Jiang, et al., "An Efficient Multiple-Path Routing Protocol for Ad Hoc Networks", Computer Communications, XP 004332672, vol. 25, No. 5, Mar. 15, 2002, pp. 478-484.
T. Clausen, et al., "Optimized Link State Routing Protocol (OLSR)", RFC3626, Oct. 2003, 68 pages.
Hakim Badis, et al., "QOLSR Multi-path Routing for Mobile Ad Hoc Networks Based on Multiple Metrics: Bandwidth and Delay", Proceedings of the 59th Vehicular Technology Conference (VTC '04'), vol. 4, IEEE 2004, pp. 2181-2184.

* cited by examiner

*Primary Examiner*—Gregory B Sefcheck
(74) *Attorney, Agent, or Firm*—Oblon, Spivak, McClelland, Maier & Neustadt, L.L.P.

(57) ABSTRACT

A communication node of the present invention includes a two-hop neighbor management portion, a routing table management portion, and a multi-path establishment portion. The two-hop neighbor management portion manages a plurality of neighbor routes to a communication node that can be reached by two hops. The routing table management portion stores a routing table for performing routing within a network. The multi-path establishment portion establishes spare routes by, when the number of hops from a destination node to an own node is a multiple of two on a standard route, identifying neighbor routes to a specific node among a plurality of neighbor routes managed by the neighbor management portion and by adding them to the routing table.

11 Claims, 9 Drawing Sheets

| DESTINATION | NEXT HOP | NUMBER OF HOPS |
|---|---|---|
| D | A | 4 |
| Y | A | 3 |
| . | . | . |
| . | . | . |
| . | . | . |

Fig.8

| DESTINATION | NEXT HOP | NUMBER OF HOPS | PRIORITY |
|---|---|---|---|
| D | A | 4 | PRIMARY |
| D | X | 4 | SECONDARY |
| D | Z | 4 | SECONDARY |
| Y | A | 3 | PRIMARY |
| ⋮ | ⋮ | ⋮ | ⋮ |

Fig.9

COMMUNICATION NODE AND ROUTING METHOD

BACKGROUND OF THE INVENTION

1. Field of the Invention

The present invention relates to a communication node and a routing method.

2. Related Background of the Invention

An ad hoc network in which data communication is performed by connecting many communication terminals mutually without the interposition of an access point such as a base station is known. For example, in a mobile ad hoc network (MANET), the network is configured by only radio nodes and data is transmitted from a source node to a destination node via a plurality of radio nodes. In non-patent document (T. Clausen and P. Jacquet, "Optimized Link State Routing Protocol (OLSR)," RFC 3626, October, 2003), a method is described, by which a path is established from a source node to a destination node in the MANET.

By the way, in the ad hoc network, the established communication path is likely to be disconnected because the radio node constituting the communication path is moved or disconnected power etc. If the communication path is disconnected during data communication, the data during communication will be lost until a new path is established. Because of this, in Japanese Patent Application Laid-Open No. 2004-336766, a technique that predicts the need of communication in the future and establishes and stores a path in advance is described.

SUMMARY OF THE INVENTION

However, in the technique described in the above-mentioned Japanese Patent Application Laid-Open No. 2004-336766, a plurality of paths are established while predicting the need of communication in order to cope with the disconnection of communication path, and therefore, a load in the network increases.

The present invention has been developed to solve the above-mentioned problem and an object thereof is to provide a communication node and a routing method capable of establishing a plurality of communication paths by suppressing an increase in processing load.

A communication node of the present invention is characterized by including a neighbor management module for managing a plurality of neighbor routes to a communication node that can be reached by a specific number of hops equal to one or more, a routing table management module for storing a routing table to perform routing in a network, and a multi-path establishment module for establishing spare routes by, when the number of hops from the destination node or source node of data to an own node is a multiple of a specific number of hops on a standard route, identifying neighbor routes to a specific node that can be reached from the own node by a specific number of hops on the standard route from among a plurality of neighbor routes managed by the neighbor management module and by adding the identified neighbor routes to the routing table.

A routing method of the present invention is characterized by including a neighbor management step in which a neighbor management module manages a plurality of neighbor routes to a communication node that can be reached by a specific number of hops equal to one or more, a routing table management step in which a routing table management module stores a routing table to perform routing in a network, and a multi-path establishment step in which a multi-path establishment module establishes spare routes by, when the number of hops from the destination node or source node of data to the own node is a multiple of a specific number of hops on a standard route, identifying neighbor routes to a specific node that can be reached from the own node by a specific number of hops on the standard route from among a plurality of neighbor routes managed by the neighbor management module and by adding the identified neighbor routes to the routing table.

According to the present invention, a multi-path establishment module establishes spare routes by, when the number of hops from the destination node or source node of data to the own node is a multiple of a specific number of hops on the standard route, identifying neighbor routes to a specific node from the own node on the standard route from among a plurality of neighbor routes managed by the neighbor management module and by adding the identified neighbor routes to the routing table. Because of this, it is possible to establish a plurality of communication paths by establishing spare routes from the own node to a specific node, independent of the standard route. In addition, since the spare routes are established by utilizing information managed by the neighbor management module and the routing table management module, it is possible to suppress an increase in the processing load in the network.

Preferably, the communication node of the present invention includes a reception module for receiving a multi-path message transmitted from one neighboring node on the standard route, to the effect that a multi-path is established, the message including IDs for identifying communication nodes existing on the standard route, a transmission module for transmitting a multi-path message to which the own ID is attached to the other neighboring node on the standard route, and a processing module for determining whether or not the number of hops from the destination node or source node of data to the own node is a multiple of the specific number of hops on the standard route based on the plurality of IDs attached to the multi-path message, wherein the multi-path establishment module establishes the spare routes when the processing module determines that the number of hops is a multiple of the specific number of hops.

As described above, each of the communication nodes on the standard route can grasp the standard route because the reception module receives the multi-path message and the own ID is attached to the received multi-path message. Then, the processing module can determine whether or not the number of hops from the destination node or source node to the own node is a multiple of the specific number of hops based on the plurality of IDs attached to the multi-path message. Due to this, it is possible to efficiently establish the spare routes by suppressing the increase in the processing load in the network.

Preferably, the communication node of the present invention further comprises an application data communication module for determining whether or not to establish spare routes based on the kind of application of the data, wherein the multi-path establishment module establishes the spare routes when the application data communication module determines to establish spare routes. Due to this, it is possible to establish spare routes more accurately and further suppress the increase in the processing load in the network.

The communication node of the present invention includes a neighbor management module for managing neighbor routes to a communication node that can be reached by two hops, a routing table management module for storing a routing table to perform routing in the network, and a multi-path establishment module for establishing spare routes by, when the number of hops from the destination node or source node of data to the own node is a multiple of two on the standard route, identifying neighbor routes to a specific node that can be reached from the own node by two hops on the standard route from among a plurality of neighbor routes managed by the neighbor management module and by adding the identified neighbor routes to the routing table.

According to the present invention, the multi-path establishment module establishes spare routes by, when the number of hops from the destination node or source node to the own node is a multiple of two on the standard route, identifying neighbor routes to a specific node from the own node on the standard route from among a plurality of neighbor routes managed by the neighbor management module and by adding the identified neighbor routes to the routing table. Due to this, it is possible to establish a plurality of communication paths by establishing spare routes from the own node to the specific node, independent of the standard route. In addition, since the spare routes are established by utilizing information managed by the neighbor management module and the routing table management module, it is possible to suppress the increase in the processing load in the network. In particular, due to this, it is possible to utilize already established OLSR routing system in the MANET.

According to the present invention, it is possible to provide a communication node and a routing method capable of establishing a plurality of communication paths by suppressing the increase in the processing load.

DESCRIPTION OF THE PREFERRED EMBODIMENTS

Preferred embodiments to implement the present invention will be described in detail below with reference to the accompanied drawings. In the description of the drawings, the same symbols are assigned to the same components and duplicate description will be omitted.

Figure 1:
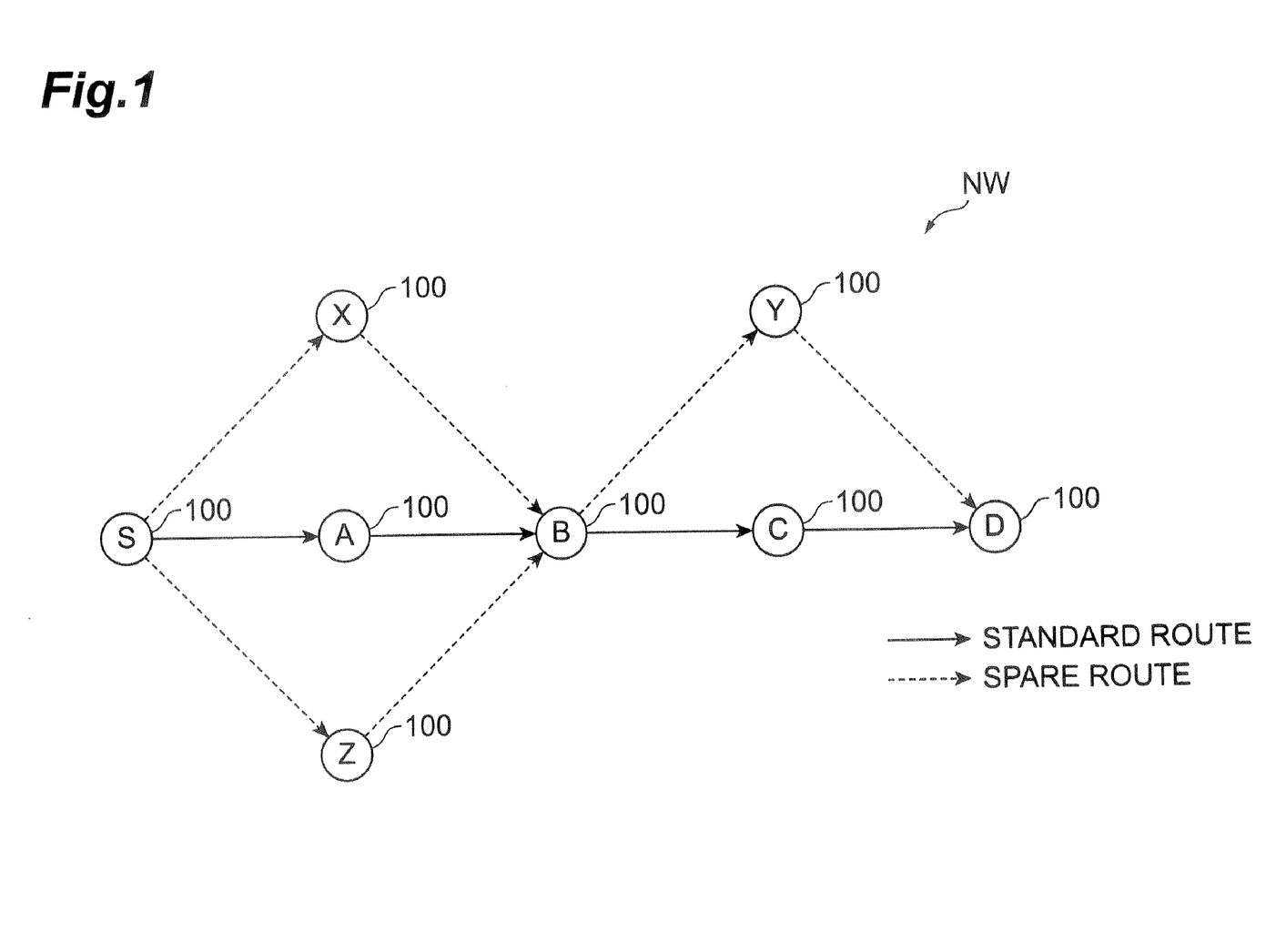
FIG. 1 is a diagram for describing a network configuration to which communication nodes according to a present embodiment belong.

FIG. 1 is a diagram for describing a network configuration to which communication nodes according to the present embodiment belong. A plurality of communication nodes 100A to 100C, 100S, 100D, and 100X to 100Z according to the present embodiment constitute a network NW.

The communication nodes 100A to 100C, 100S, 100D, and 100X to 100Z are radio terminals. For example, the communication nodes 100A to 100C, 100S, 100D, and 100X to 100Z are mobile communication terminals such as mobile phones, PDAs (Personal Digital Assistances), PHSs (Personal Handyphone Systems), personal computers, etc. or fixed communication terminals.

The network NW is a mobile ad hoc network (MANET) in which data communication is performed by connecting a plurality of communication nodes 100 to each another without the interposition of an access point. In FIG. 1, arrows of the solid lines and dotted lines connecting two communication nodes 100 indicate that the two communication nodes 100 are capable of radio communication with each other. In other words, an arrow of the solid line or dotted line means a bidirectional link between the two communication nodes 100.

The bidirectional link between two of the communication nodes 100 is referred to as one hop. The communication node 100 capable of communication by one hop is referred to as a one-hop neighbor (a neighboring node). Similarly, the communication node 100 capable of communication by two hops is referred to as a two-hop neighbor. In FIG. 1, the one-hop neighbor of the communication node 100S is the communication nodes 100A, 100X, and 100Z. The communication node 100B is the two-hop neighbor of the communication node 100S and the communication node 100C is the two-hop neighbor of the communication node 100A.

The communication nodes 100A to 100C, 100S, 100D, and 100X to 100Z have a physical component and a functional component similarly to each another. In the present embodiment, it is assumed that the communication node 100S is the source node 100S and the communication node 100D is the destination node 100D. Routing when transmitting data from the source node 100S to the destination node 100D will be described below.

In the network NW, a route from the source node 100S to the destination node 100D is configured by arbitrary ones of the communication nodes 100 among the plurality of the communication nodes 100A to 100C and 100X to 100Z. In addition, in the network NW, routing is performed by using a multi-path system. In other words, for the route from the source node 100S to the destination node 100D, a standard route and spare routes are established.

The standard route is one of the routes established as a route from the source node 100S to the destination node 100D. The spare routes are one or more routes established between the communication nodes 100 having a specific number of hops (two hops, in the present embodiment) on the standard route. In the network NW, a multi-path is established by the establishment of the standard route and the spare routes.

In the network NW, prior to data communication, the standard route and the spare routes are established, and data communication is performed by using the standard route. If the standard route is disconnected during the data communication, the route is switched to the spare route in the network NW.

More specifically, the standard route from the source node 100S to the destination node 100D (the solid line arrow in FIG. 1) is a route following "the communication node 100S, the communication node 100A, the communication node 100B, the communication node 100C, the communication node 100D" in order. The spare routes (the dotted line arrow in FIG. 1) of the above-mentioned standard route are a route of "the communication node 100S, the communication node 100X, the communication node 100B", a route of "the communication node 100S, the communication node 100Z, the communication node 100B", and a route of "the communication node 100B, the communication node 100Y, the communication node 100D".

Figure 2:
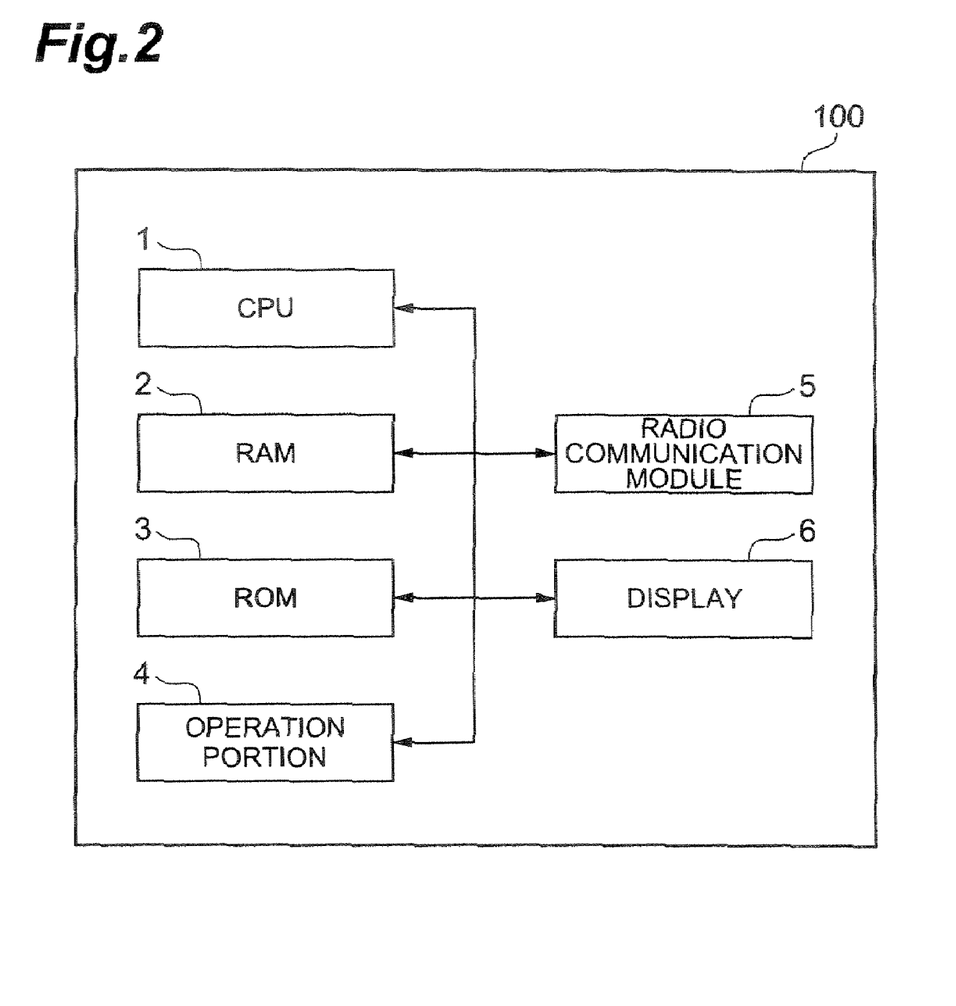
FIG. 2 is a block diagram showing a physical configuration of the communication node according to the present embodiment.

Following the above, the communication node 100 according to the present embodiment will be described in detail. FIG. 2 is a block diagram showing a physical configuration of the communication node according to the present embodiment. As shown in FIG. 2, the communication node 100 according to the present embodiment is configured as a computer system in physical terms, including a CPU 1, a RAM 2 and a ROM 3 as a main storage device, an operation portion 4 of a keyboard, a mouse, etc., as an input device, a radio communication module 5 as a transmission/reception device such as a network card, a display 6, etc.

Each function of the communication node 100 to be described later is realized by causing hardware such as the CPU 1, the RAM 2, etc., shown in FIG. 2 to read computer software to operate the operation portion 4, the radio communication module 5, and the display 6 under the control of the CPU 1 and, by reading and writing data from and into the RAM 2.

Figure 3:
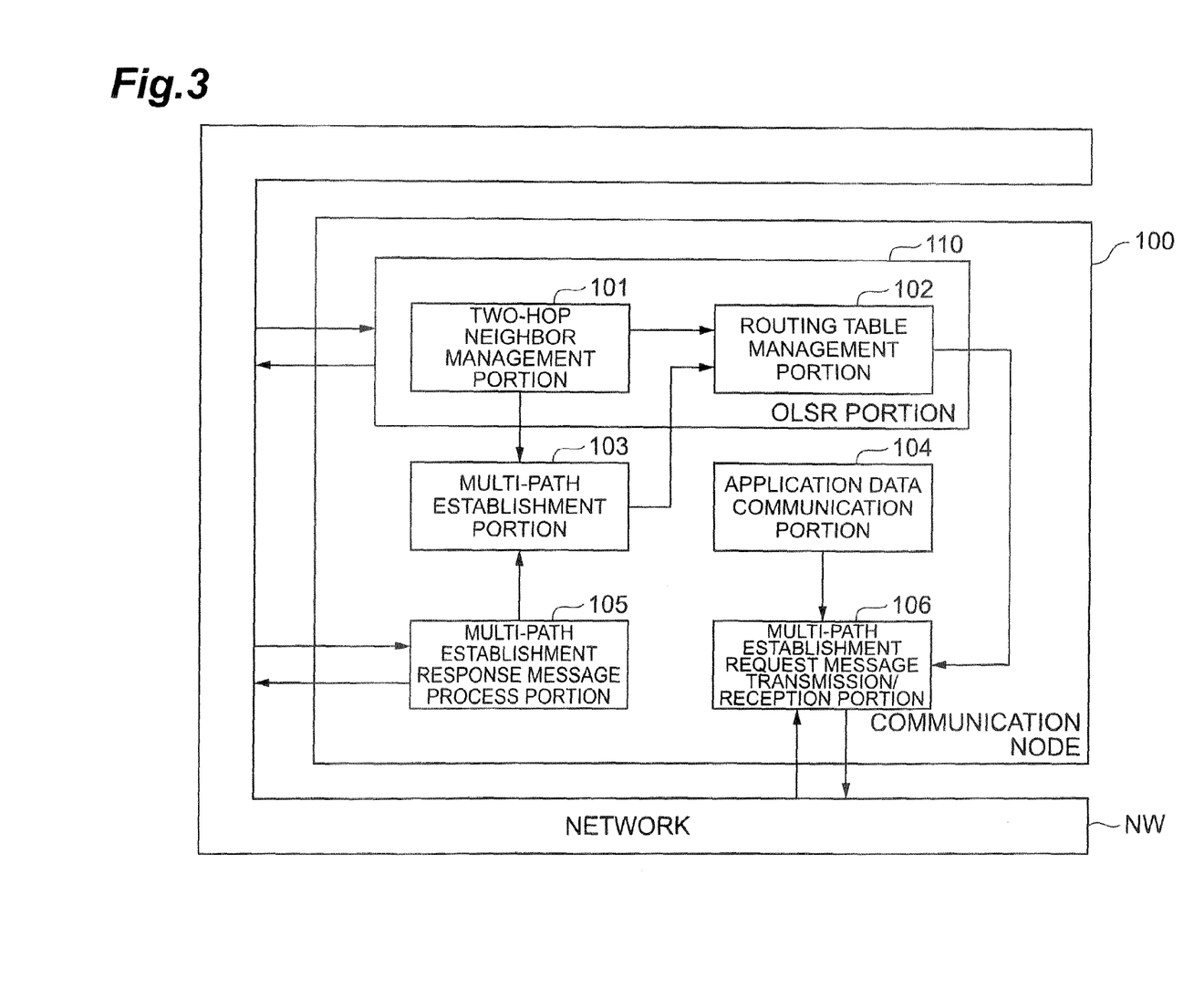
FIG. 3 is a block diagram showing a functional configuration of the communication node according to the present embodiment.

FIG. 3 is a block diagram showing a functional configuration of the communication node according to the present embodiment. The communication node 100 is configured so as to include, as functional components, a two-hop neighbor management portion (neighbor management module) 101, a routing table management portion (routing table management module) 102, a multi-path establishment portion (multi-path establishment module) 103, an application data communication portion (application data communication module) 104, a multi-path establishment response message processing portion (processing module) 105, and a multi-path establishment request message transmission/reception portion (transmission module, reception module) 106.

An OLSR (Optimized Link State Routing Protocol) portion 110 is configured by the two-hop neighbor management portion 101 and the routing table management portion 102. The OLSR portion 110 establishes a standard route in the network NW. The OLSR portion 110 is a routing protocol of proactive type in the MANET. In the network NW, one standard route from the source node 100S to the destination node 100D is established by the single-path routing system by the OLSR portion 110.

More specifically, the OLSR portion 110 checks the existence and connection state of the communication node 100 one hop and two hops ahead by exchanging a HELLO message with the communication node 100 one hop ahead at intervals of two seconds. In addition, the OLSR grasps the connection state of the network by exchanging a TC message at intervals of six seconds and establishes a standard route to the destination node 100D in the network.

The two-hop neighbor management portion 101 manages a plurality of neighbor routes up to the communication node 100 that can be reached by a specific number of hops equal to one or more (in the present embodiment, two hops). A neighbor route is a route from the own node to a two-hop neighbor. The two-hop neighbor management portion 101 stores a two-hop neighbor set (refer to non-patent document 1) of the OLSR. The two-hop neighbor set is entire connection information from the communication node (own node) 100 to the two-hop neighbor. The two-hop neighbor management portion 101 manages information on all of the one-hop neighbors via which an arbitrary two-hop neighbor is reached.

Figure 4:
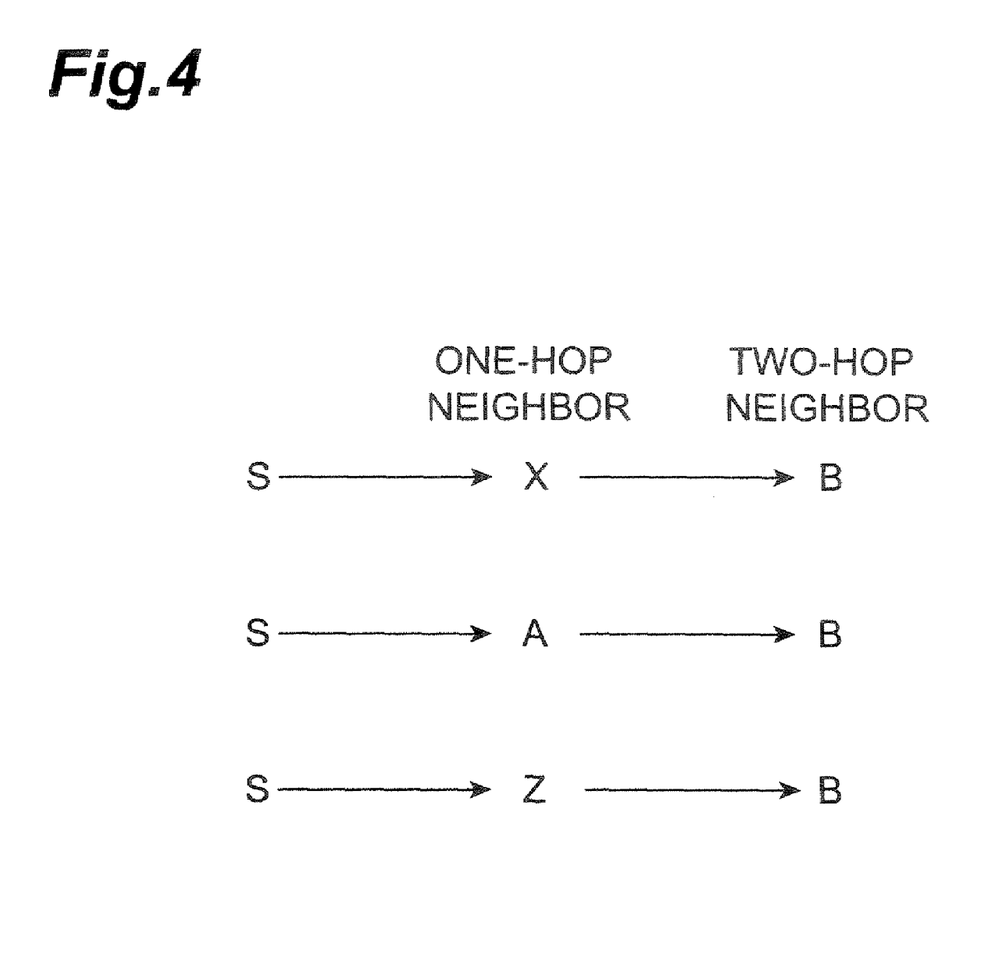
FIG. 4 is a diagram showing a data structure of a two-hop neighbor set managed by a two-hop neighbor management portion.

Description will be given more specifically with reference to FIG. 4. FIG. 4 is a diagram showing the data structure of the two-hop neighbor set managed by the two-hop neighbor management portion. FIG. 4 is the data structure managed by the two-hop neighbor management portion 101 of the source node 100S.

As shown in FIG. 1, the communication node 100S is capable of communication with the communication node 100B via the communication node 100X. Consequently, the two-hop neighbor management portion 101 of the communication node 100S associates the communication node 100X, which is a one-hop neighbor, with the communication node 100B, which is a two-hop neighbor, and stores them as one component of the two-hop neighbor set.

Similarly, the communication node 100S is capable of communication with the communication node 100B via the communication node 100A. Consequently, the two-hop neighbor management portion 101 of the communication node 100S associates the communication node 100A, which is a one-hop neighbor, with the communication node 100B, which is a two-hop neighbor, and stores them as one component of the two-hop neighbor set. In addition, the communication node 100S is capable of communication with the communication node 100B via the communication node 100Z. Consequently, the two-hop neighbor management portion 101 of the communication node 100S associates the communication node 100Z, which is a one-hop neighbor, with the communication node 100B, which is a two-hop neighbor, and stores them as one component of the two-hop neighbor set.

The routing table management portion 102 stores a routing table for performing routing within the network NW. The routing table associates the destination node 100D with a route to a specific node that can be reached by a specific number of hops (two hops in the present embodiment) from the own node on the standard route from the communication node (own node) 100 to the destination node 100D. In other words, the routing table management portion 102 associates the destination node 100D with a next hop communication node that can be reached by one hop on the standard route from the own node to the destination node 100D and registers them in the routing table of the OLSR.

Figure 5:
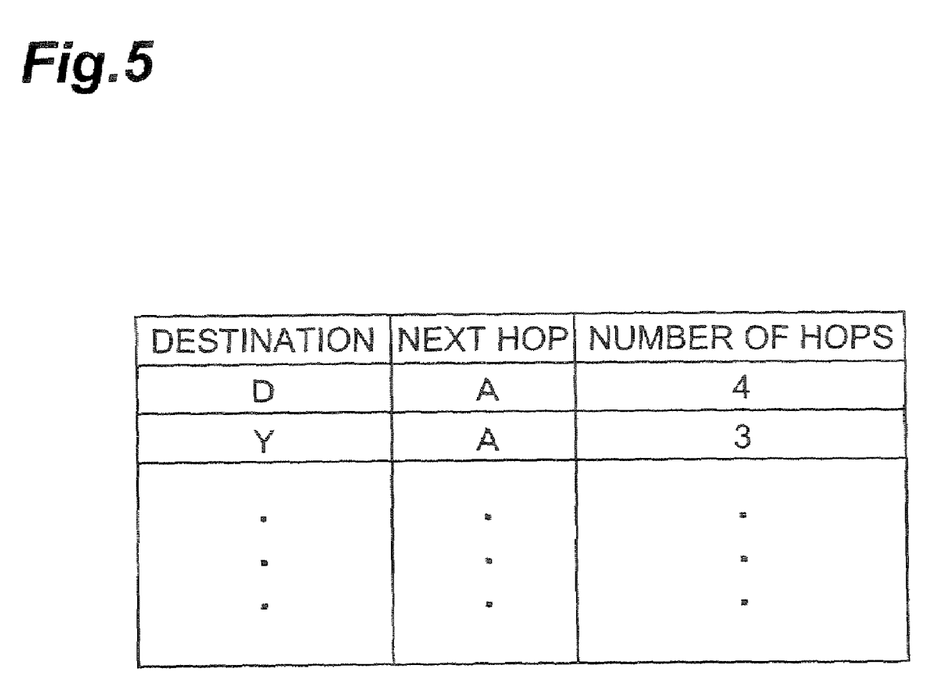
FIG. 5 is a diagram showing a routing table managed by a routing table management portion.

FIG. 5 is a diagram showing the routing table managed by the routing table management portion that the communication node according to the present embodiment includes. The routing table management portion 102 stores a standard routing table in the OLSR shown in FIG. 5. As a result, the routing table management portion 102 manages information on the standard route from the own node to each communication node that can be reached within the network NW using the routing table.

Description will be given more specifically with reference to FIG. 1 and FIG. 5. As shown in FIG. 1, the source node 100S reaches the destination node 100D by four hops via the next hop communication node 100A on the standard route. In this case, as shown in FIG. 5, the routing table management portion 102 of the source node 100S associates the ID "D" for identifying the destination node 100D with the ID "A" of the communication node 100A as a next hop communication node and the number of hops "4" and stores them.

In other words, the routing table management portion 102 has one piece of information on the next hop node as the next communication node to which data is transmitted on the standard route when transmitting data to the destination node 100D. Each communication node 100 transmits data sequentially to the next hop node on the standard route to the destination node 100D, and thereby, the data is transmitted to the destination node 100D following the standard route.

In addition, the routing table management portion 102 associates information on the next hop node on the spare route established by the multi-path establishment portion 103, as will be described later, with the communication node ID of the destination and stores them. Consequently, the routing table management portion 102 manages information on the spare routes from the own node to each communication node that can be reached within the network NW using the routing table.

The application data communication portion 104 of the source node 100S receives a request from a user for data transmission and determines whether or not to establish a multi-path (spare route) based on the kind of application of the data to be transmitted. In other words, the application data communication portion 104 determines whether a multi-path is necessary or a single-path is sufficient for transmission depending on the kind of application of the data to be transmitted.

The application data communication portion 104 determines to establish a multi-path only when the application of the data to be transmitted is an application that is considerably affected by a route switching delay, such as a real time application. In other words, the application data communication portion 104 makes a selection between using a single-path routing system and using a multi-path routing system depending on the kind of the application. When determining to establish a multi-path, the application data communication portion 104 outputs a request signal to request the establishment of a multi-path to the multi-path establishment request message transmission/reception portion 106.

Upon receipt of the request signal, the multi-path establishment request message transmission/reception portion 106 of the source node 100S generates a multi-path establishment request message (multi-path message). The multi-path establishment request message includes information indicative of the source node 100S, which is the source of the data and the source of the multi-path establishment request message, the destination node 100D, which is the destination of the data and, the destination of the multi-path establishment request message, the next hop communication node, notice to the effect that the message is a multi-path establishment request message, the number of spare routes to be established, and the ID "S" of the source node 100S.

The multi-path establishment request message transmission/reception portion 106 refers to the routing table and unicasts the generated multi-path establishment request message to the next hop communication node associated with the destination node 100D. The next hop communication node in the multi-path establishment request message corresponds to the neighboring node on the side of the neighboring destination node 100D on the standard route.

The multi-path establishment request message transmission/reception portion 106 of the communication nodes 100A to 100C receives a multi-path establishment request message from the neighboring node on the side of the source node 100S on the standard route. Upon receipt of the multi-path establishment request message, the multi-path establishment request message transmission/reception portion 106 adds the ID of the own communication node 100 to the end of the received multi-path establishment request message. Then, the multi-path establishment request message transmission/reception portion 106 of the communication nodes 100A to 100C refers to the routing table and unicasts the multi-path establishment request message to the next hop communication node associated with the destination node 100D of the data.

As a result, the multi-path establishment request message received by the multi-path establishment request message transmission/reception portion 106 includes the communication node ID existing on the standard route. In the present embodiment, the multi-path establishment request message transmission/reception portion 106 receives a multi-path establishment request message to which the IDs of the communication nodes from the source node 100S of the multi-path establishment request message until the neighboring node on the side of the source node 100S on the standard route are added in order.

Figure 6:
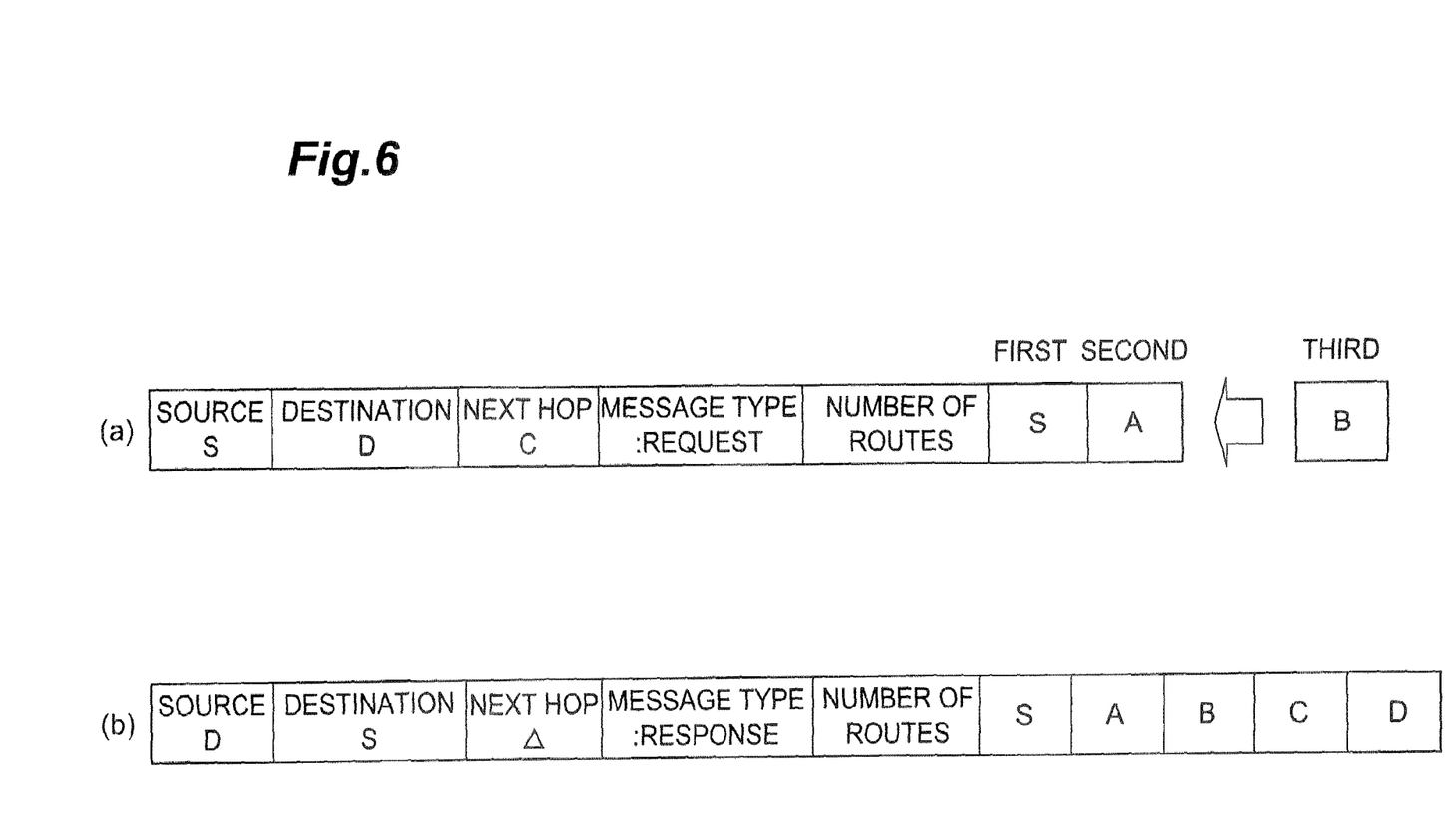
FIG. 6 is a diagram showing formats of a multi-path establishment request message and a multi-path establishment response message.

The case where the communication node 100B receives a multi-path establishment request message from the communication node 100A, as shown in FIG. 1, will be described. FIG. 6(a) is a diagram showing the format of a multi-path establishment request message.

The multi-path establishment request message that the multi-path establishment request message transmission/reception portion 106 of the communication node 100B transmits includes, as a result, information indicative of the source node 100S of the multi-path establishment request message, the destination node 100D of the multi-path establishment request message, the communication node 100C as the next hop communication node, notice to the effect that the message is a multi-path establishment request message, the number of spare routes to be established, and the standard route from the source node 100S to the communication node 100B (own node).

Upon receipt of the multi-path establishment request message, the multi-path establishment request message transmission/reception portion 106 of the destination node 100D adds the ID of the own communication node 100 to the end of the received multi-path establishment request message. Due to this, the multi-path establishment request message transmission/reception portion 106 completes information on the standard route including the IDs from the source node 100S until the destination node 100D. Then, the multi-path establishment request message transmission/reception portion 106 of the destination node 100D outputs the received multi-path establishment request message to the multi-path establishment response message processing portion 105.

When the multi-path establishment request message is input, the multi-path establishment response message processing portion 105 of the destination node 100D generates a multi-path establishment response message based on the input multi-path establishment request message. In other words, the multi-path establishment response message processing portion 105 exchanges the information indicative of the communication node of the source of the input multi-path establishment request message with the information indicative of the communication node of the destination and at the same time, changes the message to one to the effect that the message is a multi-path establishment response message and thus generates a multi-path establishment response message.

FIG. 6(b) is a diagram showing the format of a multi-path establishment response message. The multi-path establishment response message includes information indicative of notice to the effect that the communication node of the source of the multi-path establishment response message is the destination node 100D, notice to the effect that the communication node of the destination of the multi-path establishment response message is the source node 100S, the relevant next hop communication node, notice to the effect that the message is a multi-path establishment response message, the number of spare routes to be established, and the standard route. The next hop communication node in the multi-path establishment response message corresponds to the neighboring node on the side of the neighboring source node 100S on the standard route.

After generating the multi-path establishment response message, the multi-path establishment response message processing portion 105 of the destination node 100D unicasts the generated multi-path establishment response message to the neighboring node on the side of the neighboring source node 100S on the standard route.

Upon receipt of the multi-path establishment response message, the multi-path establishment response message processing portion 105 of the communication nodes 100A to 100C changes the information on the next hop communication node and unicasts the multi-path establishment response message to the neighboring node on the side of the neighboring source node 100S on the standard route.

In addition, the multi-path establishment response message processing portion 105 of the communication nodes 100A to 100C and 100S determines whether or not the own node is a path establishment node based on the information on the standard route included in the received multi-path establishment response message. In other words, the multi-path establishment response message processing portion 105 determines whether or not the own node is a path establishment node based on the plurality of IDs of the information on the standard route added to the multi-path establishment request message. The path establishment node is a communication node the number of hops of which from the destination node 100D to the own node on the standard route is a multiple of a specific number of hops (two hops in the present embodiment).

Figure 7:
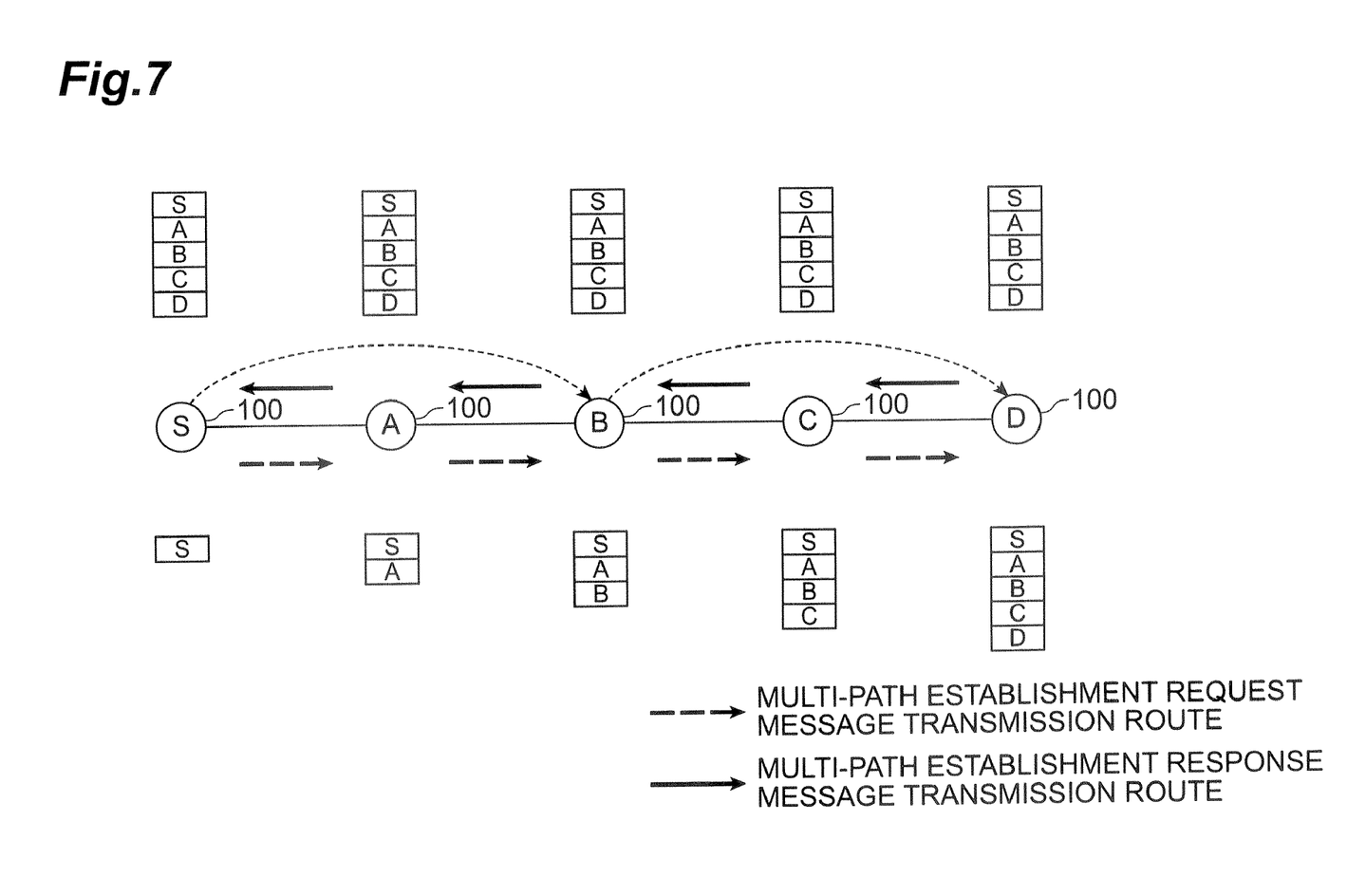
FIG. 7 is a diagram for illustrating information processing by a multi-path establishment response message processing portion.

With reference to FIG. 7, information processing by the multi-path establishment request message transmission/reception portion 106 and the multi-path establishment response message processing portion 105 will be described more specifically. FIG. 7 is a diagram for illustrating information processing by the multi-path establishment request message transmission/reception portion and the multi-path establishment response message processing portion. In FIG. 7, the broken line arrow indicates a transmission route of a multi-path establishment request message and the solid line arrow indicates a transmission route of a multi-path establishment response message.

First, the multi-path establishment request message transmission/reception portion 106 of the source node 100S generates a multi-path establishment request message to which the ID "S" is added and transmits it to the communication node 100A. Upon receipt of the multi-path establishment request message from the communication node 100S, the communication node 100A changes the information indicative of the next hop communication node, generates a multi-path establishment request message to which the ID "A" is added, and transmits it to the communication node 100B.

Similarly, a multi-path establishment request message is transmitted from the communication node 100B to the communication node 100D via the communication node 100C. In this manner, the IDs "S", "A", "B", "C", and "D" are added sequentially to the multi-path establishment request message and thus the standard route information is completed. In other words, the information indicative of the standard route included in the multi-path establishment request message is generated by the multi-path establishment request message transmission/reception portion 106 of each communication node 100 unicasting the multi-path establishment request messages to which the IDs are added sequentially.

Then, the multi-path establishment response message processing portion 105 of the communication node 100D returns the multi-path establishment response message including the standard route information through the route reverse to the standard route, and thus the standard route information is transmitted to the communication nodes 100A to 100C and the source node 100S.

The multi-path establishment response message processing portion 105 of each of the communication nodes 100A to 100C, the source node 100S, and the destination node 100D identifies what number ID is the ID for identifying the own node from the ID "D" of the destination node 100D in the standard route information and detects the position of the own node on the standard route. Then, the multi-path establishment response message processing portion 105 determines whether or not the own node is a path establishment node. The path establishment node in the present embodiment is the communication node 100B and the source node 100S.

When determining that the own node is a path establishment node, the multi-path establishment response message processing portion 105 detects the ID for identifying the communication node two-hop neighbors ahead on the standard route based on the standard route information. Specifically, the source communication node 100S recognizes that the communication node two-hop neighbors ahead is the communication node 100B based on the standard route information.

Then, when determining that the own node is a path establishment node, the multi-path establishment response message processing portion 105 outputs establishment request information to request the establishment of a multi-path to the multi-path establishment portion 103. The establishment request information includes the ID of the communication node two-hop neighbors ahead and the information on the number of paths indicative of the number of multi-paths to be established included in the multi-path establishment response message.

When the request for the multi-path establishment is input, the multi-path establishment portion 103 establishes a spare route by associating a neighbor route up to a specific node among the neighbor routes managed by the two-hop neighbor management portion 101 with the destination node 100D. The multi-path establishment portion 103 establishes spare routes in number equal to or less than the number to be established indicated by the information on the number of paths.

In other words, the multi-path establishment portion 103 refers to the two-hop neighbor set managed by the two-hop neighbor and searches for all of the routes to the specific node other the standard route. The multi-path establishment portion 103 outputs the routes that have been searched for as a result of the search to the routing table.

Specifically, the multi-path establishment portion 103 of the source communication node 100S extracts all of the one-hop neighbors associated with the ID of the two-hop neighbor included in the establishment request information among the two-hop neighbor set managed as shown in FIG. 4. The multi-path establishment portion 103 extracts the ID "X" and the ID "Z". When the number of paths indicated by the information on the number of paths is smaller than the number of communication nodes of the extracted one-hop neighbors, the multi-path establishment portion 103 extracts the ID of a one-hop neighbor randomly. The multi-path establishment portion 103 outputs the extracted one-hop neighbors to the routing table management portion 102.

In the two-hop neighbor management portion 101, the one-hop neighbors that can reach a desired two-hop neighbor are managed. Due to this, the multi-path establishment portion 103 can establish a plurality of routes from the own node to a specific two-hop neighbor. In the present embodiment, the communication node 100S can select the communication node 100X and the communication node 100Z as spare routes in addition to the communication node 100C on the standard route as a next hop in order to reach the communication node 100B.

Figure 8:
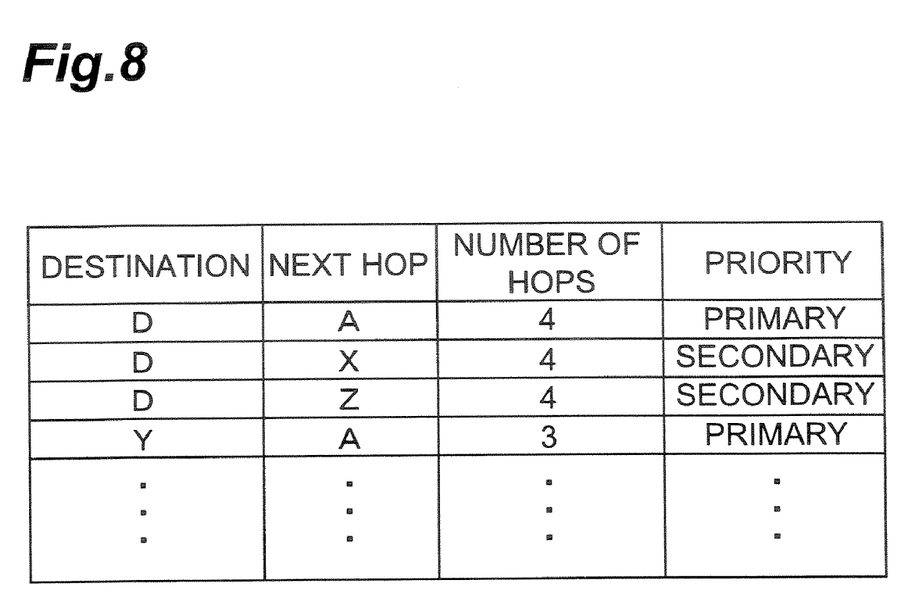
FIG. 8 is a diagram showing a routing table in which spare routes are registered.

FIG. 8 shows an example of the routing table in which the spare routes are registered. To the routing table, a route the priority of which is "primary" is registered in advance as a standard route. In other words, in the routing table, the destination communication node 100D, the next hop communication node 100A, the number of hops 4, and the priority "primary" are registered.

The routing table management portion 102 additionally registers routes the priority of which is "secondary" in the routing table as spare routes. In other words, the routing table management portion 102 registers a spare route with the destination communication node 100D, the next hop communication node 100X, the number of hops 4, and the priority "secondary", and a spare route with the destination communication node 100D, the next hop communication node 100Y, the number of hops 4, and the priority "secondary" in the routing table.

As described above, when there is a request from the multi-path establishment response message processing portion 105, the multi-path establishment portion 103 establishes spare routes based on the information of the two-hop neighbor management portion 101 and the routing table management portion 102 registers the spare routes.

On the standard route of the present embodiment, the communication node 100B is a node two hops downstream of the destination node 100D and a communication node two hops upstream of the communication node 100B is the communication node 100D. Then, the source node 100S is the second two-hop node viewed from the destination node 100D and a node two hops upstream thereof is the communication node 100B.

Because of this, in the multi-path establishment portion 103, the communication node 100B establishes a spare route up to the communication node 100D and the communication node 100S establishes spare routes up to the communication node 100B, as a result. The multi-path establishment portion 103 establishes spare routes and thereby a multi-path from the source node 100S to the destination node 100D is established. In other words, the multi-path establishment portion 103 establishes an independent multi-path between the own node and a two-hop neighbor.

By the way, in FIG. 2 showing a hardware configuration of the communication node 100 according to the present embodiment, the two-hop neighbor management portion 101, the routing table management portion 102, and the application data communication portion are stored within the RAM 2. The multi-path establishment portion 103 operates under the control of the CPU 1. The multi-path establishment response message processing portion 105 and the multi-path establishment request message transmission/reception portion 106 operate under the control of the CPU 1 and the radio communication module 5.

Next, the routing operation of the communication node 100 according to the present embodiment will be described, and the routing method according to the present embodiment will be also described. The routing method of the present embodiment includes a neighbor management step, a routing table management step, and a multi-path establishment step.

In the neighbor management step, the two-hop neighbor management portion 101 manages a neighbor route to a communication node that can be reached by two hops. In the routing table management step, the routing table management portion 102 associates the data destination node 100D with a route to a specific node that can be reached by two hops from the own node on the standard route from the own node to the data destination node 100D and manages them.

In the multi-path establishment step, the multi-path establishment portion 103 associates, when the number of hops from the data destination node 100D to the own node on the standard route is a multiple of two hops, the neighbor route to the specific node among the neighbor routes managed in the neighbor management step with the destination node 100D and establishes a spare route.

Figure 9:
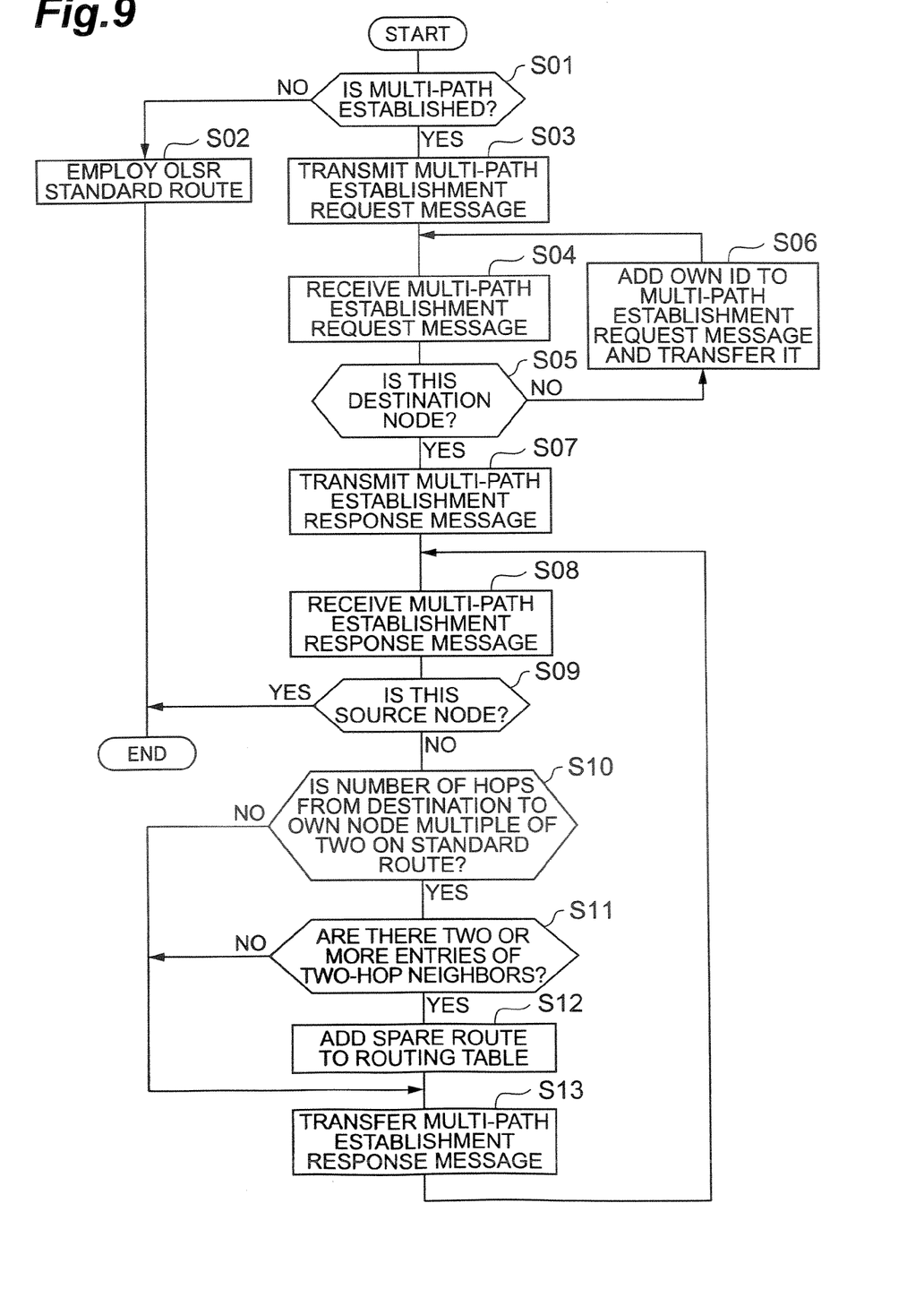
FIG. 9 is a flow chart showing a routing operation of the communication node according to the present embodiment.

Subsequently, the multi-path establishment step will be described in greater detail. FIG. 9 is a flow chart showing the routing operation of the communication node according to the present embodiment.

When a request for data transmission is received, the application data communication portion 104 of the source node 100S determines whether or not to establish a multi-path (spare route) based on the kind of the application of the data to be transmitted (S01). When it is determined that a multi-path is not established (NO in S01), the OLSR standard route is employed (S02) and the operation of routing is completed.

When it is determined that a multi-path is established (YES in S01), the multi-path establishment request message transmission/reception portion 106 of the source node 100S transmits a multi-path establishment request message (S03). When the multi-path establishment request message is transmitted, the multi-path establishment request message is received by the multi-path establishment request message transmission/reception portion 106 of the next hop communication node of the communication node 100 that has transmitted the multi-path establishment request message (S04).

When the communication node 100 that has received the multi-path establishment request message is not the destination node 100D (NO in S05), the own ID is added to the multi-path establishment request message by the multi-path establishment request message transmission/reception portion 106 and it is transferred to the next hop communication node (S06).

When the communication node that has received the multi-path establishment request message is the destination node 100D (YES in S05), a multi-path establishment response message is generated by the multi-path establishment response message processing portion 105 of the destination node 100D and it is transmitted to the next hop communication node on the route reverse to the standard route (S07). When the multi-path establishment response message is transmitted, the multi-path establishment response message is received by the multi-path establishment response message processing portion 105 of the next hop communication node of the communication node that has transmitted the multi-path establishment response message (S08).

When the communication node that has received the multi-path establishment response message is not the source node 100S (NO in step S09), the multi-path establishment response message processing portion 105 determines whether or not the own node is a path establishment node (S10).

When the own node 100 is a path establishment node (YES in S10) and a plurality of components of the two-hop neighbor set are made entry by the two-hop neighbor management portion 101 (YES in S11), a spare route is added in the routing table by the multi-path establishment portion 103 (S12). In addition, the multi-path establishment response message is transferred by the multi-path establishment response message processing portion 105 (S13).

When the own node 100 is not a path establishment node (NO in S11), the process proceeds to S13. When a plurality of components of the two-hop neighbor set are not made entry by the two-hop neighbor management portion 101 (NO in S11), the process proceeds to step 13. When the communication node 100 that has received the multi-path establishment response message is the data source node 100S (YES in S09), the routing operation is completed. Then, data communication is started.

In this manner, when the number of hops from the source communication node to the destination communication node is even, a link disjoint type multi-path as shown in FIG. 1 is established. The link disjoint type multi-path is a multi-path system in which each route has a common communication node but not a common link. When the number of hops from the source communication node to the destination communication node is odd, a partial link disjoint type multi-path is established. The partial link disjoint type multi-path of the present embodiment has one common link.

Next, the function and effect of the communication node 100 according to the present embodiment will be described. According to the present embodiment, when the number of hops from the destination node 100D to the own node on the standard route is a multiple of two, the multi-path establishment portion 103 establishes a spare route by identifying a neighbor route from the own node to the specific node on the standard route from among the plurality of neighbor routes managed by the two-hop neighbor management portion 101 and by adding the identified neighbor route to the routing table. Consequently, it is possible to establish a plurality of communication paths by establishing a spare route from the own node to the specific node independent of the standard route. In addition, since the spare route is established by utilizing the information managed by the two-hop neighbor management portion 101 and the routing table management portion 102, it is possible to suppress the increase in the processing load in the network.

In addition, in the present embodiment, the above-mentioned specific number of hops is assumed to be two. Due to this, it is possible to utilize the already established OLSR of the MANET. The standardization of the OLSR is already in progress as a single-path routing protocol. Consequently, it is very difficult to improve the basic routing mechanism of the OLSR at the present stage. Because of this, in the present embodiment, the current data structure is utilized as is without improving the basic algorithm and the data structure of the OLSR single-path routing, and thus it is possible to establish a multi-path by the OLSR.

In addition, the multi-path establishment request message transmission/reception portion 106 receives a multi-path establishment request message and adds the own ID to the received multi-path establishment request message. Consequently, it is possible for each communication node 100 on the standard route to grasp the standard route. Then, the multi-path establishment response message processing portion 105 can determine whether or not the number of hops from the destination node 100D to the own node is a multiple of a specific number of hops based on the plurality of the IDs added to the multi-path establishment response message. Consequently, it is possible to efficiently establish spare routes by suppressing the increase in the processing load in the network.

In addition, the communication node 100 of the present embodiment includes the application data communication portion 104 for determining whether or not to establish a spare route based on the kind of the application of the data. Then, the multi-path establishment portion 103 establishes a spare route when the application data communication portion 104 determines to establish a spare route. Due to this, it is possible to more accurately establish a spare route and to further suppress the increase in the processing load in the network.

By thus establishing a spare route in advance, it is possible to realize a link disjoint type multi-path system based on the OLSR. Consequently, when the standard route is unavailable, it is possible to switch to a spare route instantaneously. As a result, it is possible to considerably reduce a delay that occurs when reestablishing a route. Because of this, it is possible to suppress the data loss during transmission. In other words, it is possible to cope with the connection state in the unstable network NW in the MANET. Then, it is possible to realize an application that suppresses a delay, such as an IP telephone etc., within the MANET.

In addition, according to the present embodiment, a new control signal other than a multi-path establishment request message and a multi-path establishment response message is not necessary. Consequently, it is possible to suppress an increase in the amount of control signals. In addition, since a spare route is established independently, the switching of routes is performed locally at the communication node 100 having a multi-path at the position nearest to the communication node in which link disconnection has occurred. In other words, it is possible to switch to the spare route without imposing a load on the source node 100S. Specifically, when the link is disconnected between the communication node 100C and the communication node 100D, the nearest communication node having a multi-path is the communication node 100B and therefore the communication node 100B switches the route to the communication node 100D to that via the communication node 100Y. Consequently, no load is imposed on other communication nodes 100 on the standard route.

In addition, in the present embodiment, since a multi-path is established around the standard route, the establishment process is less time-consuming compared to the case where a multi-path is established by the broad-cast system based on the on-demand type routing protocol. Further, it is possible to implement the present embodiment by utilizing the data structure of the OLSR the foundation of which has already been established.

By the way, in the case of the standard OLSR, the hello packet exchange interval is 2 sec. and the TC message generation interval is 6 sec. If these intervals are reduced, it is possible to reduce a path switching delay. However, a problem of an increase in the network load arises due to occurrence of a large amount of control signals. Consequently, there is a physical limit to the single-path routing system and also a limit to the reduction in the path switching delay.

On the other hand, at present, a multi-path establishment system based on the on-demand type routing system has been proposed in the MANET, however, there is a problem in that a path establishment delay is large. In contrast to this, in the present embodiment, since a spare route is established by utilizing the nature of the high-speed of the OLSR of the proactive type routing system to suppress the increase in the load in the network NW, it is possible to reduce the route switching time.

Next, a modification example of the communication node 100 according to the present embodiment will be described. It is assumed that a multi-path establishment request message and a multi-path establishment response message are arbitrary in their message format as long as they request the establishment of an independent spare route up to the respective two-hop neighbors on the standard route with respect to the communication node 100 at two-hop intervals when viewed from the data destination node 100D.

In addition, it is possible to apply the routing method of the present embodiment even when the multi-path establishment request message transmission/reception portion 106 and the multi-path establishment response message processing portion 105 mentioned above are not provided. In such a case, the multi-path establishment portion 103 establishes all of the spare routes up to the two-hop neighbor based on the information from the two-hop neighbor management portion 101. Then, the routing table management portion 102 registers the established spare route in the routing table. In this case, all of the communication nodes 100 establish a multi-path and reflect in the routing table at all times.

In addition, it is assumed that the determination of switching from the standard route to a spare route is arbitrary. For example, the disconnection of the standard route and the deterioration in the quality thereof can be thought as a trigger to switch to the spare route. After switching from the standard route to the spare route, the switched spare route is recognized as a standard route and a new spare route may be established for the recognized standard route.

In addition, there is a survival time for the information used in the present embodiment. The information used in the present embodiment is the two-hop neighbor set, the routing table, etc. After a lapse of the survival time, the update work is conducted. As a survival time interval, such one defined within the OLSR is recommended, however, its setting is generally arbitrary.

In addition, the path establishment node is defined as a communication node whose number of hops from the destination node 100D to the own node is a multiple of two on the standard route, however, it may also be possible to define the path establishment node as a communication node whose number of hops from the source node 100S to the own node is a multiple of two.

In addition, the communication node 100 is not limited to a communication node that performs radio communication and a communication node that performs data communication using cables may be included.

What is claimed is:

1. A communication node comprising:
a neighbor management module configured to manage a plurality of neighbor routes to another communication node that can be reached by a specific number of hops equal to one or greater;
a routing table management module configured to store a routing table for performing routing within a network; and
a multi-path establishment module configured to establish spare routes by, when the number of hops from a destination node or a source node of data to the communication node is a multiple of the specific number of hops on a standard route, identifying neighbor routes to a specific node that can be reached by the specific number of hops from the communication node on the standard route from among the plurality of neighbor routes managed by the neighbor management module and by adding the identified neighbor routes to the routing table;
a reception module configured to receive a multi-path message to the effect that a multi-path is established, transmitted from one neighboring node on the standard route, including IDs for identifying communication nodes existing on the standard route; and
a processing module configured to determine whether or not the number of hops from the destination node or source node of the data to the communication node is a multiple of the specific number of hops on the standard route based on the plurality of IDs added to the multi-path message,
wherein the multi-path establishment module establishes the spare routes when the processing module determines that the number of hops is a multiple of the specific number of hops.

2. The communication node according to claim 1, further comprising:
a transmission module configured to transmit a multi-path message, which is the multi-path message to which the communication node ID has been added, to another neighboring node on the standard route.

3. The communication node according to claim 1, further comprising an application data communication module configured to determine whether or not the spare routes are established based on a kind of an application of the data,
wherein the multi-path establishment module establishes the spare routes when the application data communication module determines to establish the spare routes.

4. The communication node according to claim 1, further comprising:
a transmission module configured to unicast a multi-path message, which is the multi-path message to which the communication node ID has been added, to another neighboring node on the standard route.

5. The communication node according to claim 1,
wherein the processing module detects, when the number of hops is a multiple of the specific number of hops, an ID identifying a communication node that can be reached by the specific number of hops, in the plurality of IDs added to the multi-path message; and
the multi-path establishment module establishes the spare routes by searching for neighbor routes from the plurality of neighbor routes managed by the neighbor management module, based on the ID detected by the processing module.

6. A communication node comprising:
a neighbor management module configured to manage neighbor routes to another communication node that can be reached by two hops;
a routing table management module configured to store a routing table for performing routing within a network; and
a multi-path establishment module configured to establish spare routes by, when the number of hops from a destination node or a source node of data to the communication node is a multiple of two on a standard route, identifying neighbor routes to a specific node that can be reached by two hops from the communication node on the standard route from among the plurality of neighbor routes managed by the neighbor management module and by adding the identified neighbor routes to the routing table;
a reception module configured to receive a multi-path message to the effect that a multi-path is established, transmitted from one neighboring node on the standard route, including IDs for identifying communication nodes existing on the standard route; and
a processing module configured to determine whether or not the number of hops from the destination node or source node of the data to the communication node is a multiple of two on the standard route based on the plurality of IDs added to the multi-path message,
wherein the multi-path establishment module establishes the spare routes when the processing module determines that the number of hops is a multiple of two.

7. The communication node according to claim 6, further comprising:
  a transmission module configured to unicast a multi-path message, which is the multi-path message to which the communication node ID has been added, to another neighboring node on the standard route.

8. The communication node according to claim 6,
  wherein the processing module detects, when the number of hops is a multiple of the specific number of hops, an ID identifying a communication node that can be reached by the specific number of hops, in the plurality of IDs added to the multi-path message; and
  the multi-path establishment module establishes the spare routes by searching for neighbor routes from the plurality of neighbor routes managed by the neighbor management module, based on the ID detected by the processing module.

9. A routing method, implemented on a communication node, comprising:
  managing, at a neighbor management module of the communication node, a plurality of neighbor routes to another communication node that can be reached by a specific number of hops equal to one or greater;
  storing, at a routing table management module of the communication node, a routing table for performing routing within a network; and
  establishing, at a multi-path establishment module of the communication node, spare routes by, when the number of hops from a destination node or a source node of data to the communication node is a multiple of the specific number of hops on a standard route, identifying neighbor routes to a specific node that can be reached by the specific number of hops from the communication node on the standard route from among the plurality of neighbor routes managed by the neighbor management module and by adding the identified neighbor routes to the routing table;
  receiving, at a reception module of the communication node, a multi-path message to the effect that a multi-path is established, transmitted from one neighboring node on the standard route, including IDs for identifying communication nodes existing on the standard route; and
  determining, at a processing module of the communication node, whether or not the number of hops from the destination node or source node of the data to the communication node is a multiple of two on the standard route based on the plurality of IDs added to the multi-path message,
  wherein the multi-path establishment module establishes the spare routes when the processing module determines that the number of hops is a multiple of two.

10. The method according to claim 9, further comprising:
  unicasting a multi-path message, which is the multi-path message to which the communication node ID has been added, to another neighboring node on the standard route.

11. The method according to claim 9,
  wherein the processing module detects, when the number of hops is a multiple of the specific number of hops, an ID identifying a communication node that can be reached by the specific number of hops, in the plurality of IDs added to the multi-path message; and
  the multi-path establishment module establishes the spare routes by searching for neighbor routes from the plurality of neighbor routes managed by the neighbor management module, based on the ID detected by the processing module.

* * * * *